(12) United States Patent
Suzuki (10) Patent No.: US 9,305,359 B2
(45) Date of Patent: Apr. 5, 2016

(54) IMAGE PROCESSING METHOD, IMAGE PROCESSING APPARATUS, AND COMPUTER PROGRAM PRODUCT

(71) Applicant: Takeshi Suzuki, Kanagawa (JP)

(72) Inventor: Takeshi Suzuki, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 130 days.

(21) Appl. No.: 14/190,544

(22) Filed: Feb. 26, 2014

(65) Prior Publication Data

US 2014/0241625 A1 Aug. 28, 2014

(30) Foreign Application Priority Data

Feb. 27, 2013 (JP) .................................. 2013-036993

(51) Int. Cl.
*G06K 9/00* (2006.01)
*G06T 7/00* (2006.01)
*G06T 7/40* (2006.01)

(52) U.S. Cl.
CPC ............. *G06T 7/0081* (2013.01); *G06T 7/0087* (2013.01); *G06T 7/408* (2013.01); *G06T 2207/10024* (2013.01); *G06T 2207/20076* (2013.01); *G06T 2207/20081* (2013.01); *G06T 2207/30201* (2013.01)

(58) Field of Classification Search
CPC ............... G06T 5/00; G06T 5/40; G06T 7/00; G06T 7/0079; G06T 7/0081; G06T 7/0087; G06T 7/0093; G06T 7/408; G06T 2207/10024; G06T 2207/20141; G06K 9/00234; G06K 9/34; G06K 9/342; G06K 9/36; G06K 9/46; G06K 9/4638; G06K 9/4642; G06K 9/4652; G06K 9/50; G06K 9/54; G06K 9/60
See application file for complete search history.

(56) References Cited

U.S. PATENT DOCUMENTS

| 8,345,974 B2* | 1/2013 | Bergman et al. | 382/173 |
| 8,913,831 B2* | 12/2014 | Bergman et al. | 382/173 |
| 2011/0110590 A1 | 5/2011 | Suzuki | |
| 2012/0236334 A1 | 9/2012 | Suzuki | |
| 2013/0070304 A1 | 3/2013 | Suzuki | |
| 2013/0222817 A1 | 8/2013 | Suzuki et al. | |

OTHER PUBLICATIONS

K. Sobottka and I.Pitas, Face localization and facial feature extraction based on shape and color information, Proceedings of the IEEE International Conference on Image Processing, Lausanne Switzerland, Sep. 1996, vol. 3, pp. 483-486.

(Continued)

*Primary Examiner* — Jose Couso
(74) *Attorney, Agent, or Firm* — Oblon, McClelland, Maier & Neustadt, L.L.P (57) ABSTRACT

According to an aspect of the present invention, an image processing method for extracting a pixel having a specific feature includes: extracting pixels representing an object, to which the pixel having the specific feature belongs, from a given input image based on an image feature other than color; extracting principal colors from the pixels; selecting, from a plurality of pre-trained color distribution models deposited in a repository, a color distribution model closest in distance metric, which indicates distance relative to the extracted principal colors, to the extracted principal colors by performing a search through the repository using the extracted principal colors; and segmenting the input image by categorizing pixels in the input image using the selected color distribution model.

7 Claims, 13 Drawing Sheets

(56) References Cited

OTHER PUBLICATIONS

A. Albiol I, et al., Optimum Color Spaces for Skin Detection, IEEE 2001, Proceedings, International Conference on Image Processing. 2001, 3 pages.

Q. Zhu, et al., An adaptive skin model and its application to objectionable image filtering, Proceedings of the 12th annual ACM international conference on Multimedia, 2004, pp. 56-63.

F. Dadgostar and A. Sarrafzadeh, An adaptive real-time skin detector based on Hue thresholding : A comparison on two motion tracking models, Pattern Recognition Letters, vol. 27, 2006, pp. 1342-1352.

MH Yang and N. Ahuja, Proceedings SPIE digital library, Gaussian Mixture Model for Human Skin Color and Its Applications in Image and Video Databases, 1999, 9 pages.

The Object Detection (Open Source Computer Vision (OpenCV) ), URL:http://opencv.jp/sample/object_detection.html, Oct. 1, 2013(Retrieval Date). 2 pages.

"Haar Feature-based Cascade Classifier for Object Detection", OpenCV 2.4.8.0 documentation, URL:http://docs.opencv.org/modules/objdetect/doc/cascade_classification.html, Oct. 1, 2013(Retrieval Date), 9 pages.

Kimiyoshi Miyata, et al., Quality Improvement of Noisy Images by Wiener FiltersDesigned in Color Space, The journal of the Society of Scientific Photography of Japan Feb. 25, 2000, vol. 63, No. 1, p. 18-27 (with English Abstract).

* cited by examiner

IMAGE PROCESSING METHOD, IMAGE PROCESSING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2013-036993 filed in Japan on Feb. 27, 2013.

BACKGROUND OF THE INVENTION

1. Field of the Invention

The present invention relates generally to an image processing method, an image processing apparatus, and a computer program product.

2. Description of the Related Art

Conventionally, as a method for extracting a skin region, a method that utilizes a model trained with color data about skin regions of a large number of people is generally used. For example of this method, see K. Sobottka and I. Pitas, "Face localization and facial feature extraction based on shape and color information", Proceedings of the IEEE International Conference on Image Processing, Lausanne, Switzerland, September 1996, vol. 3, pp. 236-241 and/or A. Albiol, et al., "Optimum Color Spaces for Skin Detection", Proceedings of the International Conference on Image Processing, 2001.

Each of these methods defines a certain range in a specific color space as a skin-color region, and segments an input image according to a model constructed from the skin-color region. However, various errors, i.e., variations in lighting, race, individual differences, and the like are undesirably incorporated in the constructed model and make it difficult to derive high accuracy from these methods.

Another approach makes adaptation by preparing a plurality of models in advance and appropriately changing a model according to an input (see, e.g., Q. Zhu, at el., "An adaptive skin model and its application to objectionable image filtering", Proceedings of the 12th annual ACM international conference on Multimedia, pp. 56-63). This approach increases accuracy by performing two-step filtering: first, input data is classified using a generic skin-color model; and at a latter step, filtering using an adaptive model is performed. However, this approach performs processing based only on pixel color information and makes determination as to whether or not a skin-similar region is a true skin region based on the color information. Accordingly, even when a non-skin region contains a same color as skin, this region is undesirably utilized as sample data. In this case, an adaptive model, which is trained at the latter step, inevitably contains a noise; as a result, accuracy decreases.

Another approach identifies a skin region based on information other than color and performs adaptive processing using the information (see, e.g., F. Dadgostar and A. Sarrafzadeh, "An adaptive real-time skin detector based on Hue thresholding: A comparison on two motion tracking models", Pattern Recognition Letters, 2006). According to this example, a region to be tracked is determined using a generic skin-color model. A local filter is created based on a result of motion detection in the region, and definitive region extraction is performed using the filter. This approach is effective in application to moving video images, in which a moving object is a human, for example; however, this approach is not applicable to still images or a general image sequence. Even when applied to video data, this approach cannot yield a sufficiently high accuracy because definitive region segmentation is performed only by adaptive Hue thresholding.

As described above, conventional techniques fail to robustly extract a specific region, such as a skin-color region, that varies greatly depending on lighting, differences among individuals, and the like.

Accordingly, there is a need to provide an image processing method and a computer program product for extracting a specific region from an input image with high accuracy.

SUMMARY OF THE INVENTION

It is an object of the present invention to at least partially solve the problems in the conventional technology.

According to the present invention, there is provided an image processing method for extracting a region having a specific feature, the image processing method comprising: extracting pixels representing an object, to which the pixel having the specific feature belongs, from a given input image based on an image feature other than color; extracting principal colors from the pixels; selecting, from a plurality of pre-trained color distribution models deposited in a repository, a color distribution model closest in distance metric to the extracted principal colors by performing a search through the repository using the extracted principal colors, the distance metric indicating distance relative to the extracted principal colors; and segmenting the input image by categorizing pixels in the input image using the selected color distribution model.

The present invention also provides an image processing apparatus for extracting a region having a specific feature, the image processing apparatus comprising: a first extracting unit configured to extract pixels representing an object, to which the pixel having the specific feature belongs, from a given input image based on an image feature other than color; a second extracting unit configured to extract principal colors from the pixels; a selecting unit configured to select, from a plurality of pre-trained color distribution models deposited in a repository, a color distribution model closest in distance metric to the extracted principal colors by performing a search through the repository using the extracted principal colors, the distance metric indicating distance relative to the extracted principal colors; and segmenting unit configured to segment the input image by categorizing pixels in the input image using the selected color distribution model.

The present invention also provides a non-transitory computer-readable recording medium that contains a computer program that causes a computer to function as: a first extracting unit configured to extract pixels representing an object, to which the pixel having the specific feature belongs, from a given input image based on an image feature other than color; a second extracting unit configured to extract principal colors from the pixels; a selecting unit configured to select, from a plurality of pre-trained color distribution models deposited in a repository, a color distribution model closest in distance metric to the extracted principal colors by performing a search through the repository using the extracted principal colors, the distance metric indicating distance relative to the extracted principal colors; and segmenting unit configured to segment the input image by categorizing pixels in the input image using the selected color distribution model.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Basic concept of the present invention is to provide means for extracting a region having a specific color (memory color) representing a skin, sky, vegetation, or the like from an image. In particular, skin is an important region in image correction specialized for a photographed subject. Because human skin provides a plurality of types of usable information including information (e.g., color) about a region, information for recognition as an object (e.g., face), and information about skin texture represented by an edge value or the like. Accordingly, a skin region is desirably detected with high accuracy. However, variations in lighting, race, individual difference, and the like make it difficult to accurately separate a skin region from non-skin regions in an image even when some technique is applied to a feature space.

If a feature independent of those variations can be extracted from an arbitrary input image, extraction with high accuracy will be achieved. However, there is a limit to the degree of lighting condition that can be compensated by automatic white balancing. Furthermore, variations in skin image data due to different races and individual differences are wide, and it is considerably difficult to incorporate these variations into a single model.

Figure 1:
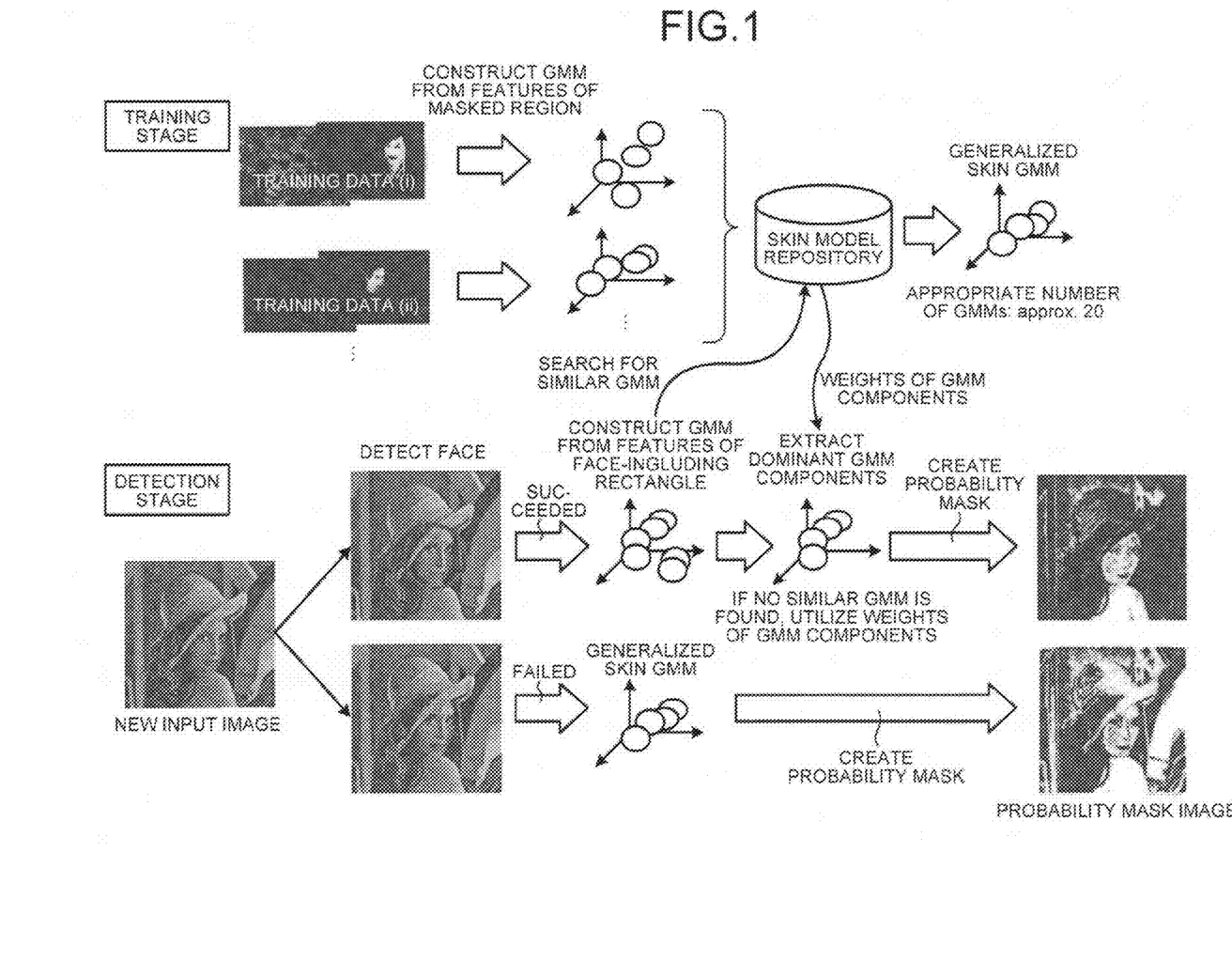
FIG. 1 is a diagram illustrating an overview of the present invention in accordance with an embodiment.

FIG. 1 is a diagram for describing an overview of the present invention in accordance with an embodiment. According to the embodiment, at a training stage, skin-region image data is sampled from skin regions of various environments, various races, and various individuals in advance, and the image data is respectively modeled. At a detection stage, when a new input image is given, a face region is extracted from the input image; a model that is closest in distance metric to the face region is estimated based on principal colors of the extracted area. The entire input image is segmented using this model. Thus, skin region extraction from the input image can be performed with high accuracy by utilizing a skin-region-image-data model obtained under a specific condition (lighting, race, individual, and the like). When a face region cannot be extracted from the input image, skin region extraction is performed using a pre-trained, generalized skin model.

Figure 2:
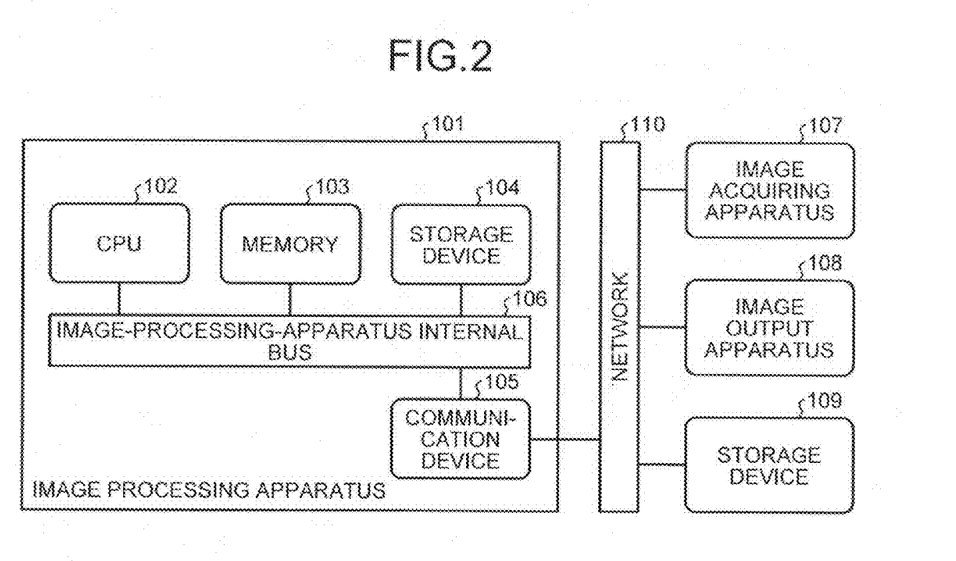
FIG. 2 illustrates a system configuration according to the embodiment.

FIG. 2 illustrates a system configuration according to the embodiment. The system according to the embodiment can be implemented as software (program) on a general personal computer (PC), which serves as an image processing apparatus. An image processing apparatus 101 internally includes a CPU 102 for performing computation, a memory 103 for storing data temporarily, a storage device 104 for long-term storage, and a communication device 105 for external communication. These are connected to each other via a system bus (internal bus) 106. The image processing apparatus 101 is also connected to other systems (an image acquiring apparatus 107, an image output apparatus 108 (e.g. a printer), and a storage device 109 (e.g. a network attached storage (NAS))) via a network 110.

Figure 3:
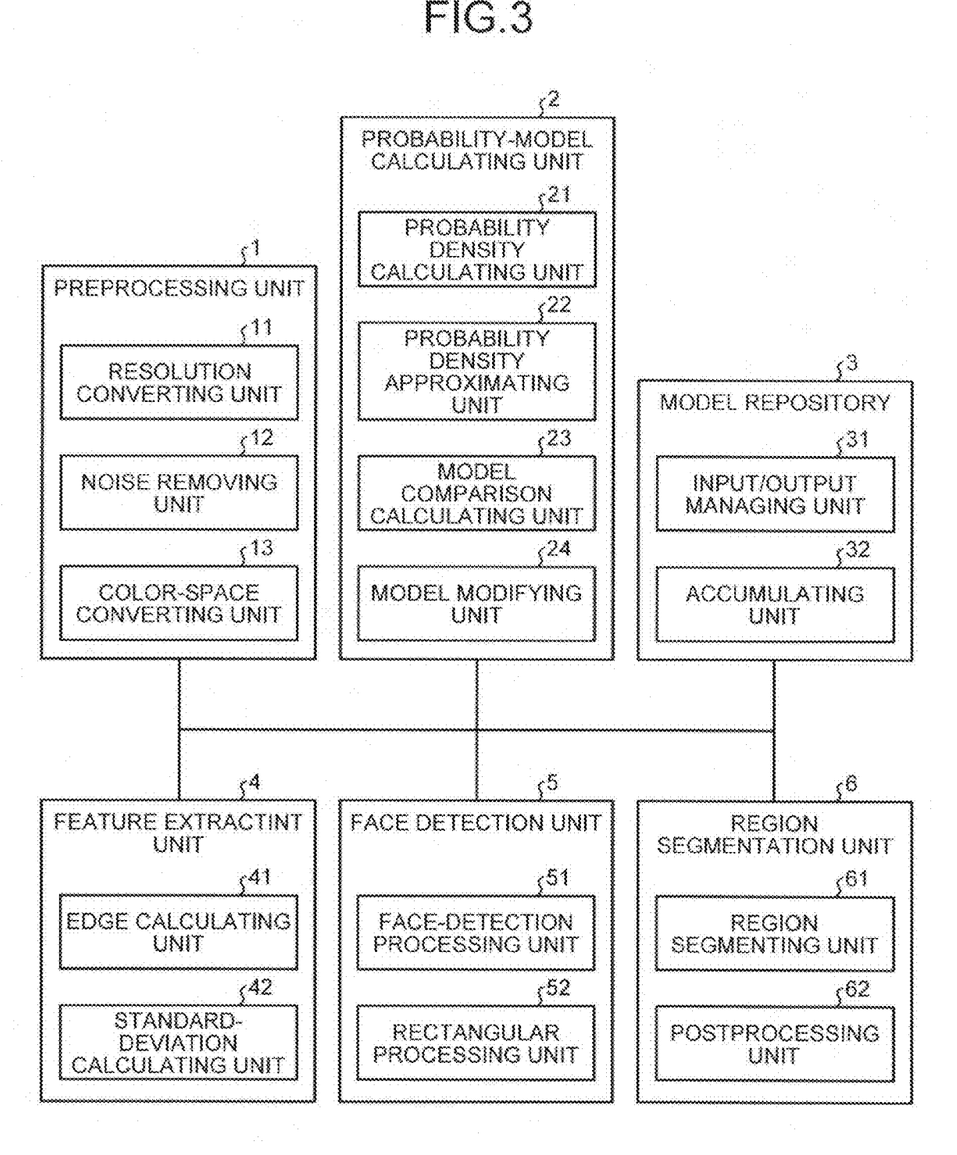
FIG. 3 illustrates a functional configuration for implementing an image processing method according to the embodiment.

FIG. 3 illustrates a functional configuration for implementing an image processing method in accordance with the embodiment. The image processing apparatus 101 includes a preprocessing unit 1, a probability-model calculating unit 2, a model repository 3, a feature extracting unit 4, a face detection unit 5, and a region segmentation unit 6.

The embodiment is structurally characterized by the model repository 3 where a plurality of pre-trained color distribution models are to be deposited and a model modifying function that is provided by the probability-model calculating unit 2. These functional blocks are implemented by being loaded from the storage device into the memory in the system configuration.

The preprocessing unit 1 includes a resolution converting unit 11, a noise removing unit 12, and a color-space converting unit 13. The preprocessing unit 1 performs resolution conversion to make a resolution of an input original image and that of a mask image uniform and performs noise removal and color-space conversion only on the original image. In the embodiment, an example where the original image is converted to HSV color space is described. However, the original image may be converted to another color space because the system of the embodiment is not based on a specific color space.

The probability-model calculating unit 2 includes a probability-density calculating unit 21, a probability-density approximating unit 22, a model-comparison calculating unit 23, and a model modifying unit 24. The probability-density calculating unit 21 collects pixel data from a region, which is a part of the original image undergone the color space conversion and filtered through the mask image, and calculates probability densities. The probability-density approximating unit 22 models the probability densities using a predetermined modeling method. In the embodiment, the probability densities are modeled by Gaussian mixture modeling (GMM). (For GMM, see, e.g., M H Yang and N. Ahuja, "Gaussian Mixture Model for Human Skin Color and Its Applications in Image and Video Databases", SPIE Digital Library, SPIE Proceedings, 1999.)

The model-comparison calculating unit 23 calculates a distance between two given models. This distance is utilized as an index indicating similarity between the models. Although there are a number of definitions and calculation methods for an inter-model distance, in the embodiment, a score value E is calculated based on the inter-model distance in a manner described later.

The model utilized in the embodiment is approximation of a probability density distribution by a mixture of a plurality of Gaussian components. Each model constructed from n, which is a mixture number (the number of Gaussian components utilized in the model), components is expressed by covariance matrices of n means $\mu$, variances $\sigma$, a set of weights m, and the number of feature dimensions nx. In the embodiment, an inverse of a mean of outputs obtained by respectively inputting means of Gaussian components of a model A to a model B is used as a distance between the model A and the model B. This distance is utilized as the score value E. Note that when the mean of the outputs is zero, the score value E is set to NULL. This score value does not strictly satisfy the distance definition because the score value is not symmetrical; however, this lack of symmetry does not matter because symmetry is not required in the embodiment. The score value E can be defined otherwise. For instance, a mean of minimum values of means of the Gaussian components of the model A and means of the Gaussian components of the model B can be used. If an increase in computational complexity is permissible, the score value E may be defined using a distance (e.g., the Bhattacharyya distance) between distributions of an arbitrary number of data points selected from each of the models A and B.

The model modifying unit 24 compares two given GMMs and calculates a score value of each component by performing the calculation described below. The model modifying unit 24 deletes a component(s) having a low score value, and modifies weights of the GMM components of the model according to remaining components.

Hereinafter, the model A denotes an existing model; the model B denotes an input model. A score value F of each of GMM components of the model B is calculated. An output obtained by simply inputting a mean of the components to the model A is used as the score value F. A score value of each of the components of the model B is compared with a preset threshold value. Any component of which score value is lower than the threshold value is deleted. Meanwhile, weights are assigned to a GMM so that a sum of weights of components that make up the GMM is one. To maintain this consistency, when a component is deleted, it is necessary to modify (re-define) weights of the remaining components. Weights can be re-assigned in accordance with ratios of weights of the remaining components.

The model repository 3 where the plurality of color distribution models are to be deposited is implemented as a general database. Accordingly, the model repository 3 internally includes an input/output managing unit 31 and an accumulating unit 32. The feature extracting unit 4 includes an edge calculating unit 41 and a standard-deviation calculating unit 42. The edge calculating unit 41 calculates edge values of the input image using a Sobel operator, for example. The standard-deviation calculating unit 42 calculates a standard deviation.

The face detection unit 5 extracts a face region (which is an object to which a pixel having a specific image feature other than color belongs) from the input image. Face detection can be performed through arbitrary processing. For example, the Object Detection (Open Source Computer Vision (OpenCV)) at http://opencv.jp/sample/object_detection.html can be utilized. A face-detection processing unit 51 generally specifies a rectangular region including a face. A rectangular processing unit 52 performs extraction from the input image by utilizing this information about the rectangular region.

The region segmentation unit 6 includes a region segmenting unit 61 and a postprocessing unit 62. The region segmenting unit 61 calculates the features of the input image on a per-pixel basis and obtains model outputs by inputting the features into a model for use in region segmentation. The postprocessing unit 62 performs postprocessing, such as spot noise removal, by utilizing the model outputs calculated on the per-pixel basis. Spot noise removal can be performed using a scheme described in, e.g., Miyata et al., "Quality Improvement of Noisy Images by Wiener Filters Designed in Color Space", Journal of the Society of Photography and Imaging of Japan, Vol. 63, No. 1, Feb. 25, 2000, pp. 18-27.

Figure 4:
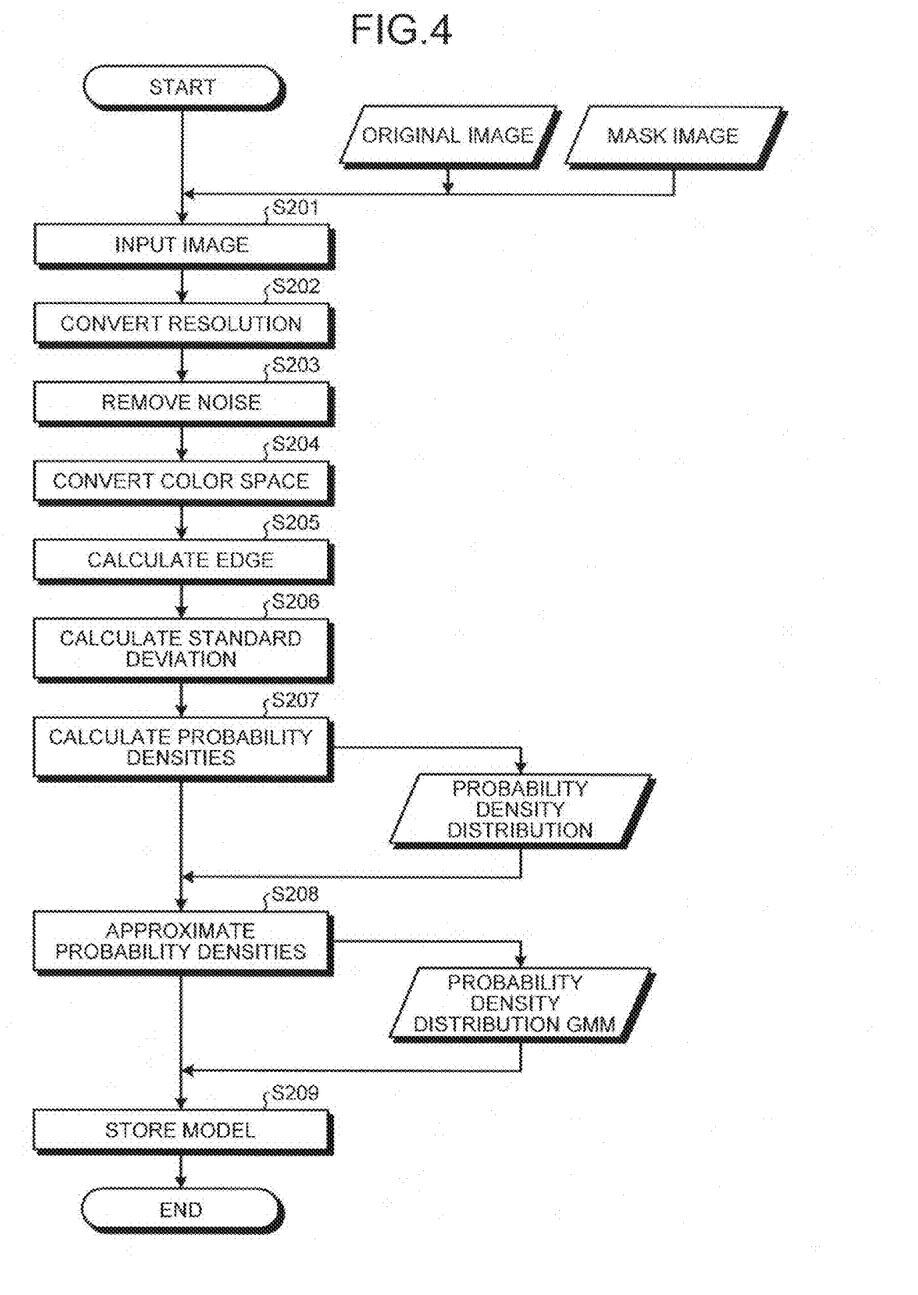
FIG. 4 illustrates a flowchart for constructing a GMM representing a single image at a training stage according to the embodiment.
Figure 7:
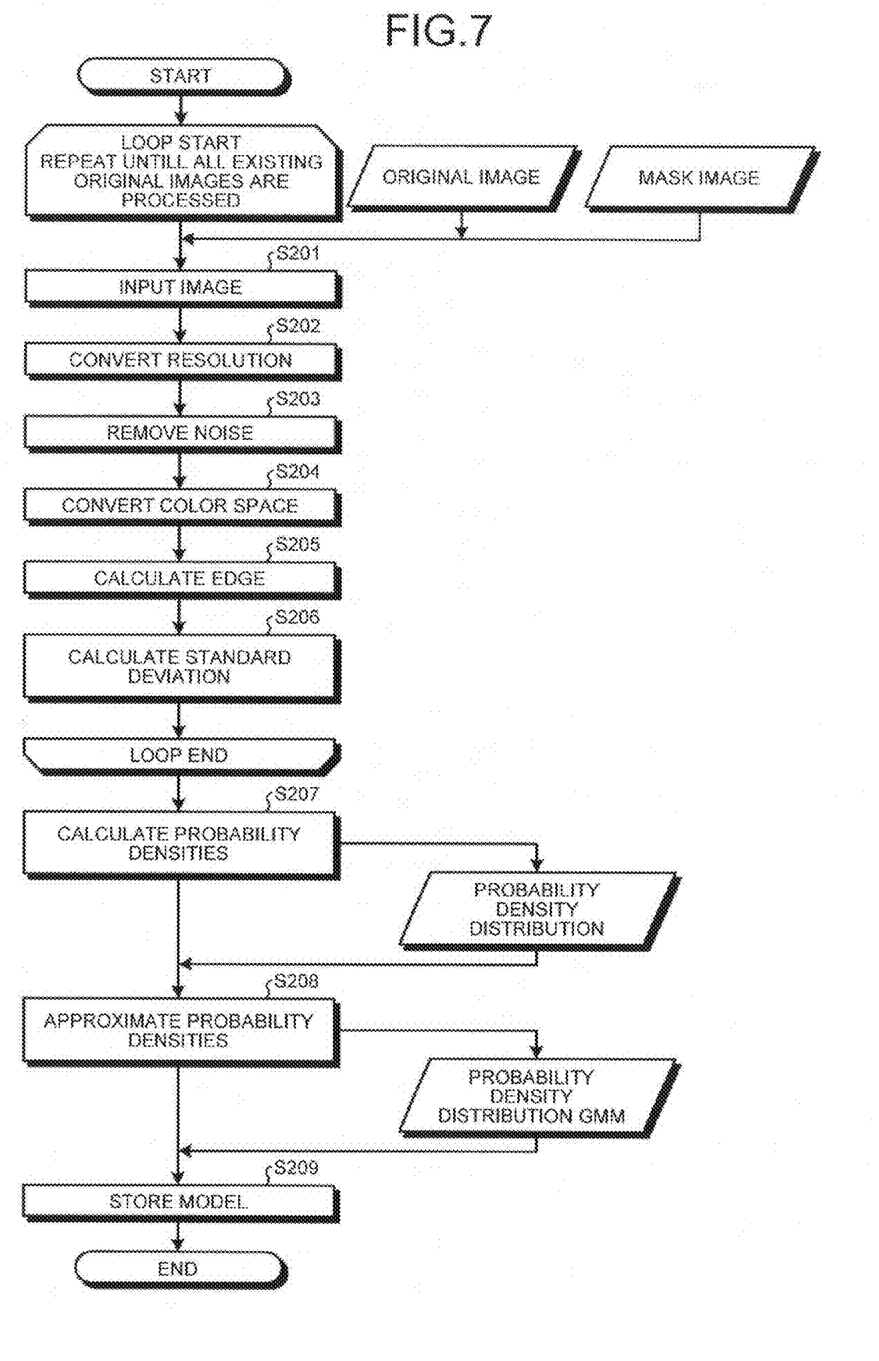
FIG. 7 illustrates a flowchart for constructing a GMM representing a plurality of images at the training stage according to the embodiment.

Next, the training stage and the detection stage according to the embodiment are described below. FIG. 4 illustrates a flowchart for constructing a GMM representing a single image in the training stage according to the embodiment. FIG. 7 illustrates a flowchart for constructing a GMM representing a plurality of images in the training stage according to the embodiment. Data utilized and data to be output in each step is additionally presented on the right side of the flowchart as supplementary information. In addition, in this training stage, as shown in FIG. 7, Steps S201 to S206 are repeated until all existing original images are processed.

In the training stage, skin-feature GMMs are constructed from a plurality of input images on a per-image basis (Steps S201 to S208). The GMMs are stored in the model repository 3 (Step S209). Furthermore, a generalized skin-feature GMM is also constructed by utilizing skin region data obtained from all the images.

Figure 5:
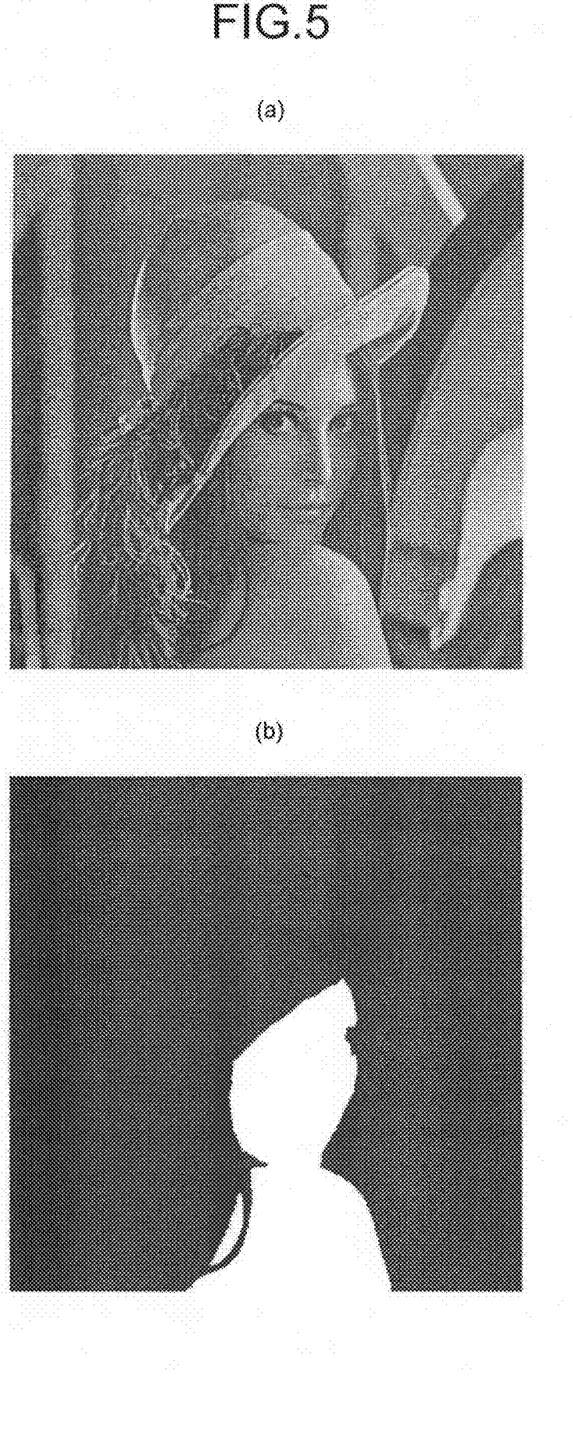
FIGS. 5(a) and 5(b) respectively illustrate an input image and a mask image.

Training is described below by way of example, in which the image illustrated in FIG. 5(a) is given as an input image, and the image illustrated in FIG. 5(b) is a mask image. Pixels in a region of the input image corresponding to a white portion of the mask image are assumed as pixels belonging to a skin region for use in training.

Figure 6:
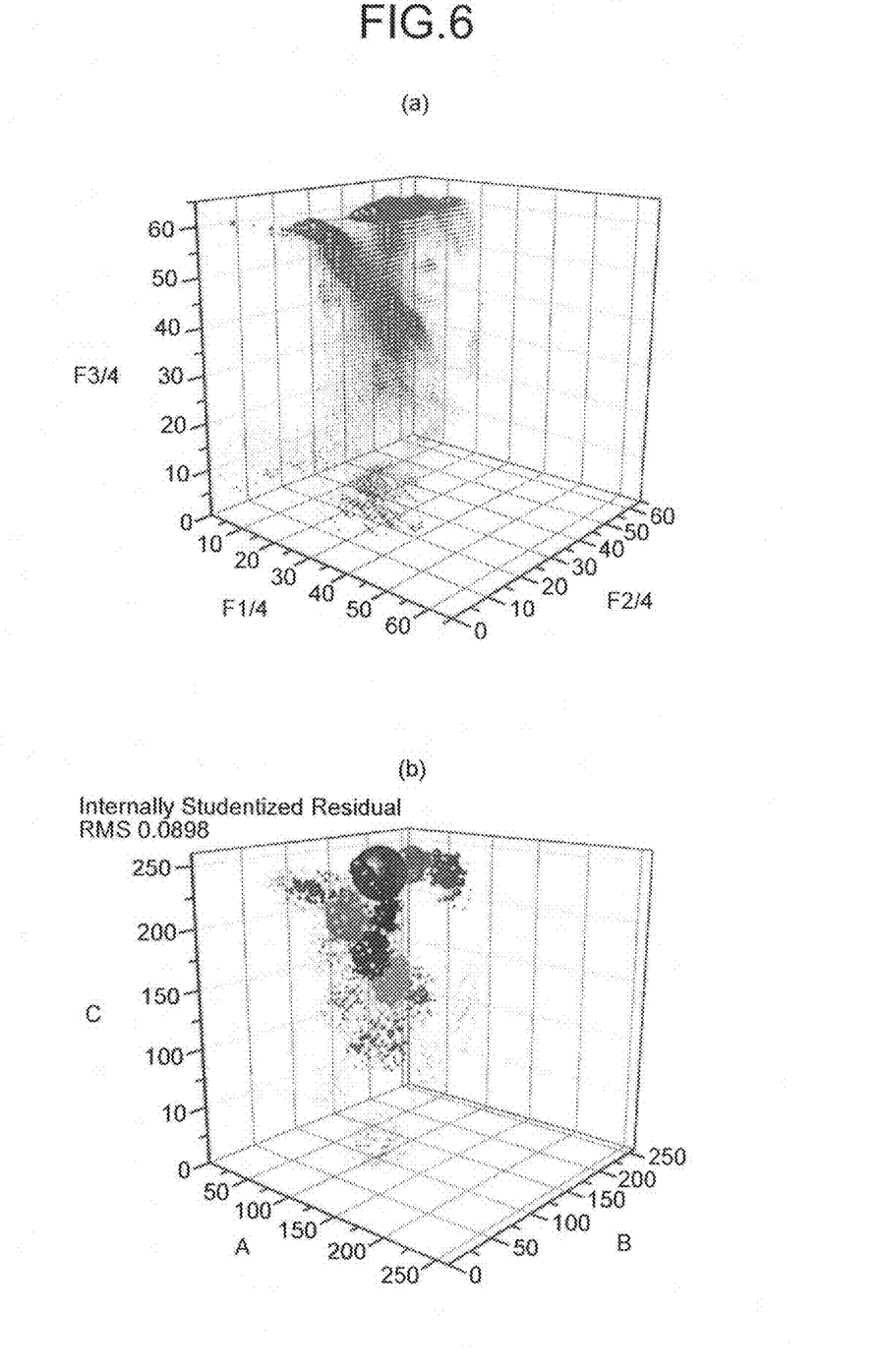
FIGS. 6(a) and 6(b) respectively illustrate an example of probability density distribution of skin pixels in a three-dimensional feature space and an example, in which the distribution is modeled by GMM.

In the training stage, in a case where the input image is converted into the HSV color space by color-space conversion (Step S204), edge values and standard deviations are respectively calculated for each of three dimensions of H, S, and V (Steps S205 and S206). Accordingly, nine-dimensional probability density distribution of skin pixels is obtained (Step S207). FIG. 6(a) illustrates a probability density distribution that is reduced in the number of dimensions to three dimensions for simplicity. FIG. 6(a) illustrates an example of probability density distribution of skin pixels in a three-dimensional feature space. FIG. 6(b) illustrates an example, in which the distribution illustrated in FIG. 6(a) is modeled by GMM.

In the illustrated example, the number of components n is provisionally set to 20, and the components are respectively plotted in different colors, which are not distinguishable in FIGS. 6(a) and 6(b). The size of each sphere represents the level of its probability. Each Gaussian component has a mean vector whose number of dimensions is equal to the number of feature dimensions. Referring to FIG. 7, although the probability densities are calculated as in FIG. 4, skin data obtained from the plurality of images is combined together (looped Steps S201 to S206), and probability density distribution and its model are calculated from the combined skin data (Steps S207 to S209).

Figure 8:
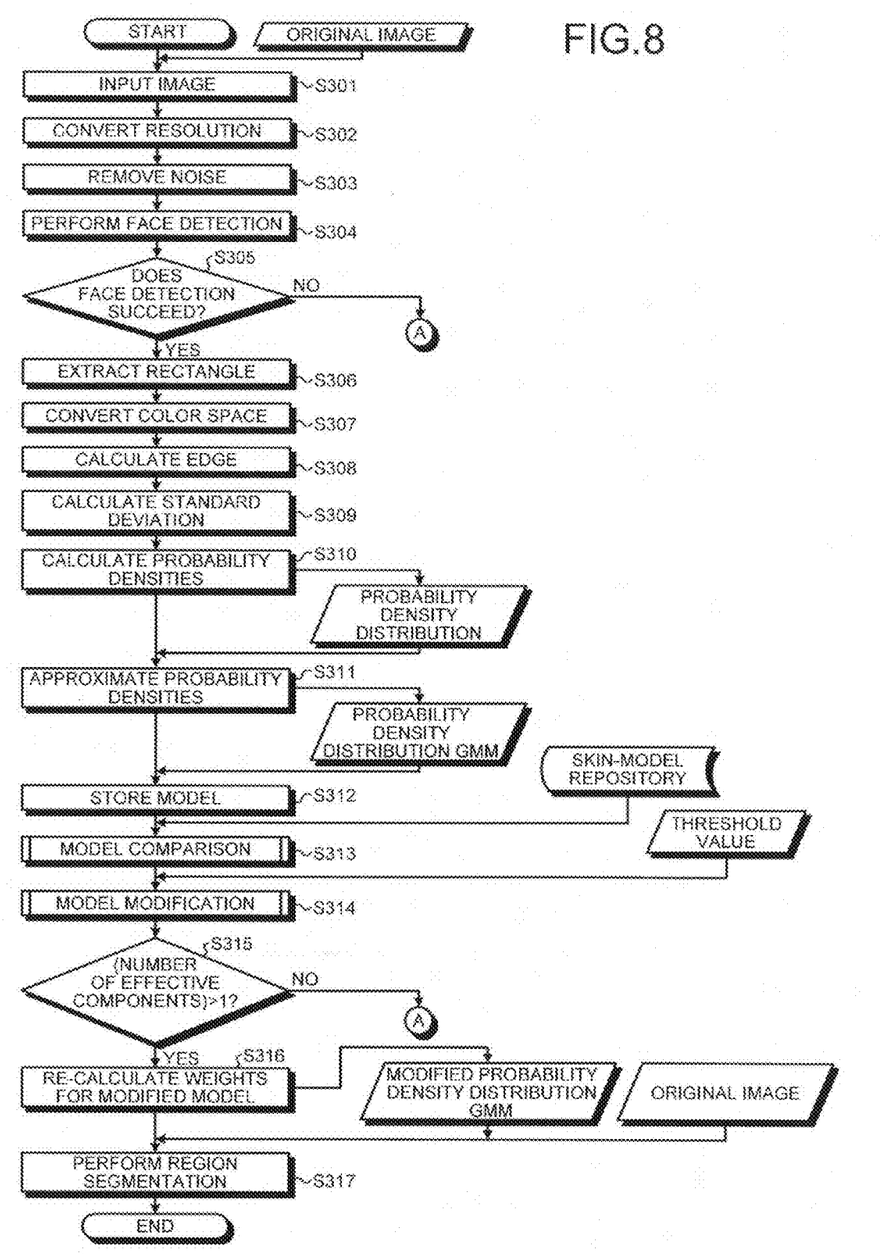
FIG. 8 is a flowchart of steps at a detection stage according to the embodiment.

FIG. 8 illustrates a flowchart of the detection stage according to the embodiment. Face-region detection in the input image is performed (Steps S301 to S304). When the face detection is successfully performed (Yes in Step S305), a rectangular face region is extracted. A GMM representing the face region is constructed as in the training stage (Steps S306 to S312). The GMM is compared with a skin-model repository (Step S313). The GMM obtained from the input image is modified (Steps S314 to S316). Region segmentation of the input image is performed using either a most similar GMM or the modified GMM (Step S317).

In the embodiment, region segmentation of the input image is performed using a most similar GMM obtained by performing a search through the skin-model repository. If no similar GMM is found (i.e., when the search fails), the GMM obtained from the input image is modified, and region segmentation of the input image is performed using the modified GMM.

Figure 9:
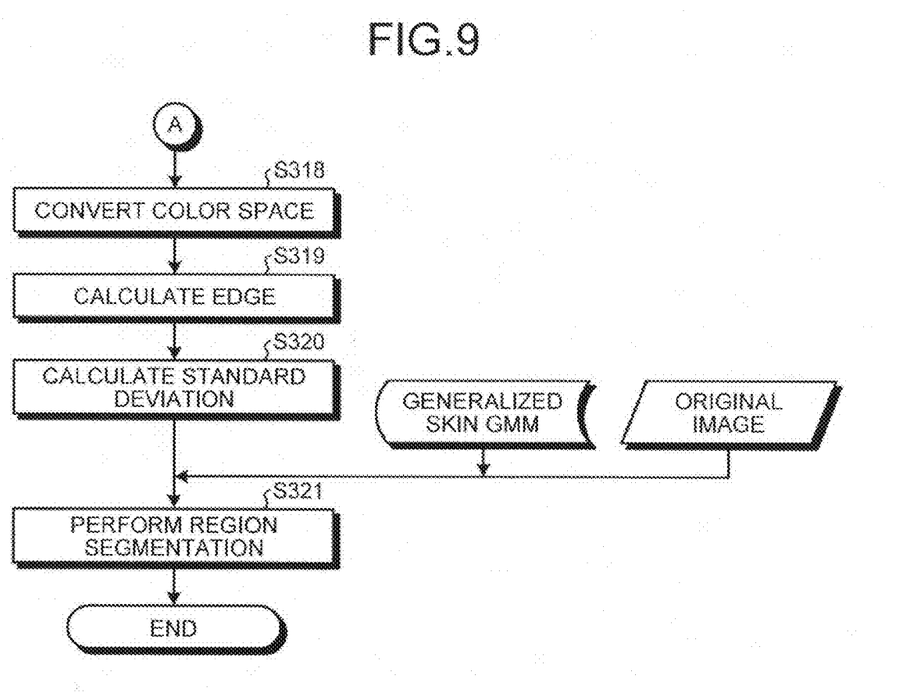
FIG. 9 illustrates a flowchart, according to the embodiment, of steps to be taken when face detection fails or when component thresholding fails.

FIG. 9 illustrates a flowchart of steps to be taken when face detection fails or when component thresholding fails. When face detection has failed (No in Step S305), region segmentation of the input image is performed using the generalized skin model (Steps S318 to S321).

Figure 11:
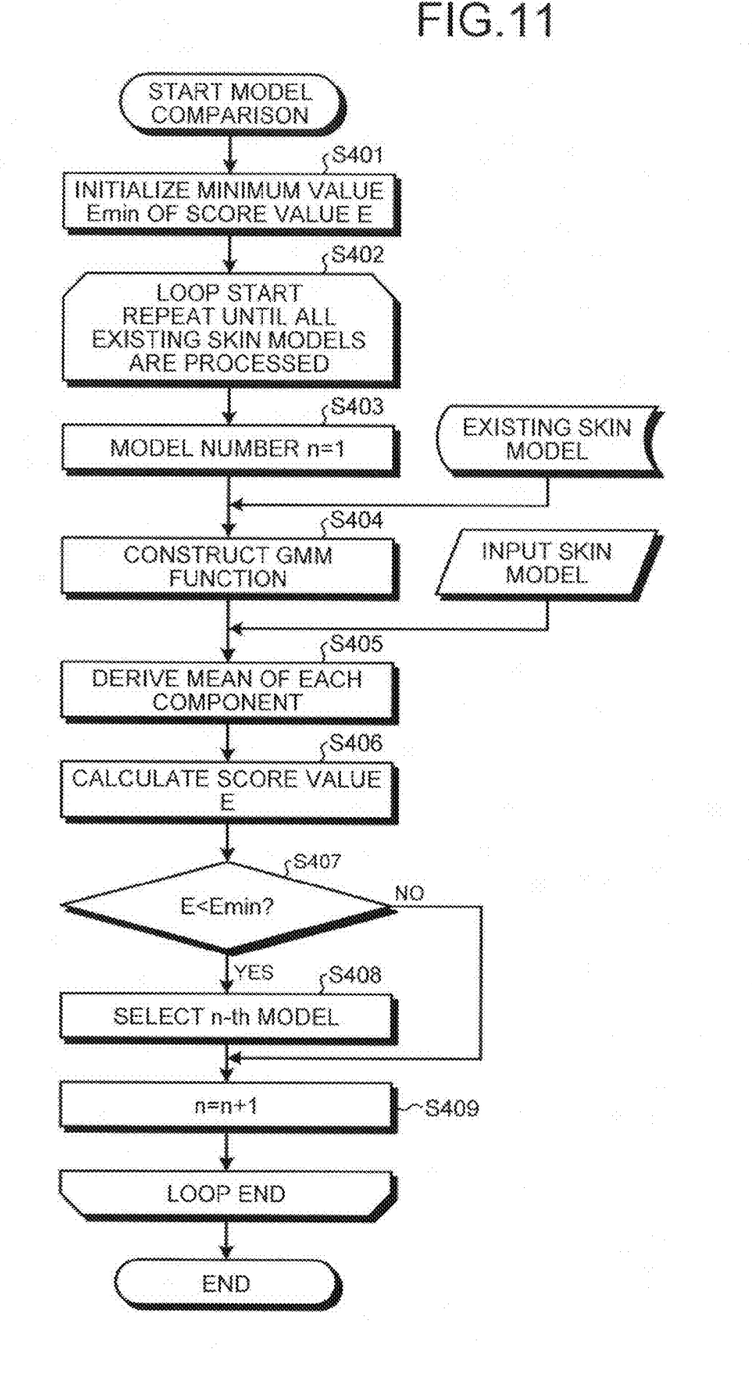
FIG. 11 is a flowchart of a model comparison step.

FIG. 11 is a flowchart illustrating a model comparison step, Step S313 of FIG. 8, in detail. In the model comparison step specifically illustrating in FIG. 11, Steps S403 to S409 are repeated until all skin models are processed. The score value E can be calculated by using the following scheme, for example. The model A is an existing skin model; the model B is an input skin model. Each of the models A and B is a GMM with n components, where n is a preset fixed number. A(x) is an output obtained when x is input to the model A. Am(x) is a weighted output obtained when x is input to a component m of the model A. An each mean Aμ$_m$ of the component m of the model A is derived (Step S405).

Each model is an approximation of a probability density distribution by GMM. Therefore, an output obtained by inputting x is a probability value for x. Therefore, an inverse of the probability can be utilized as a distance scale (distance metric). The score value E defined as follows is calculated (Step S406).

$$E = n \Big/ \sum_n A(B\mu_n) \text{ for } \sum_n A(B\mu_n) \neq 0$$

$$E = NULL \text{ for } \sum_n A(B\mu_n) = 0$$

A model n that is smallest in the score value E is selected (Steps S407 and S408).

Figure 12:
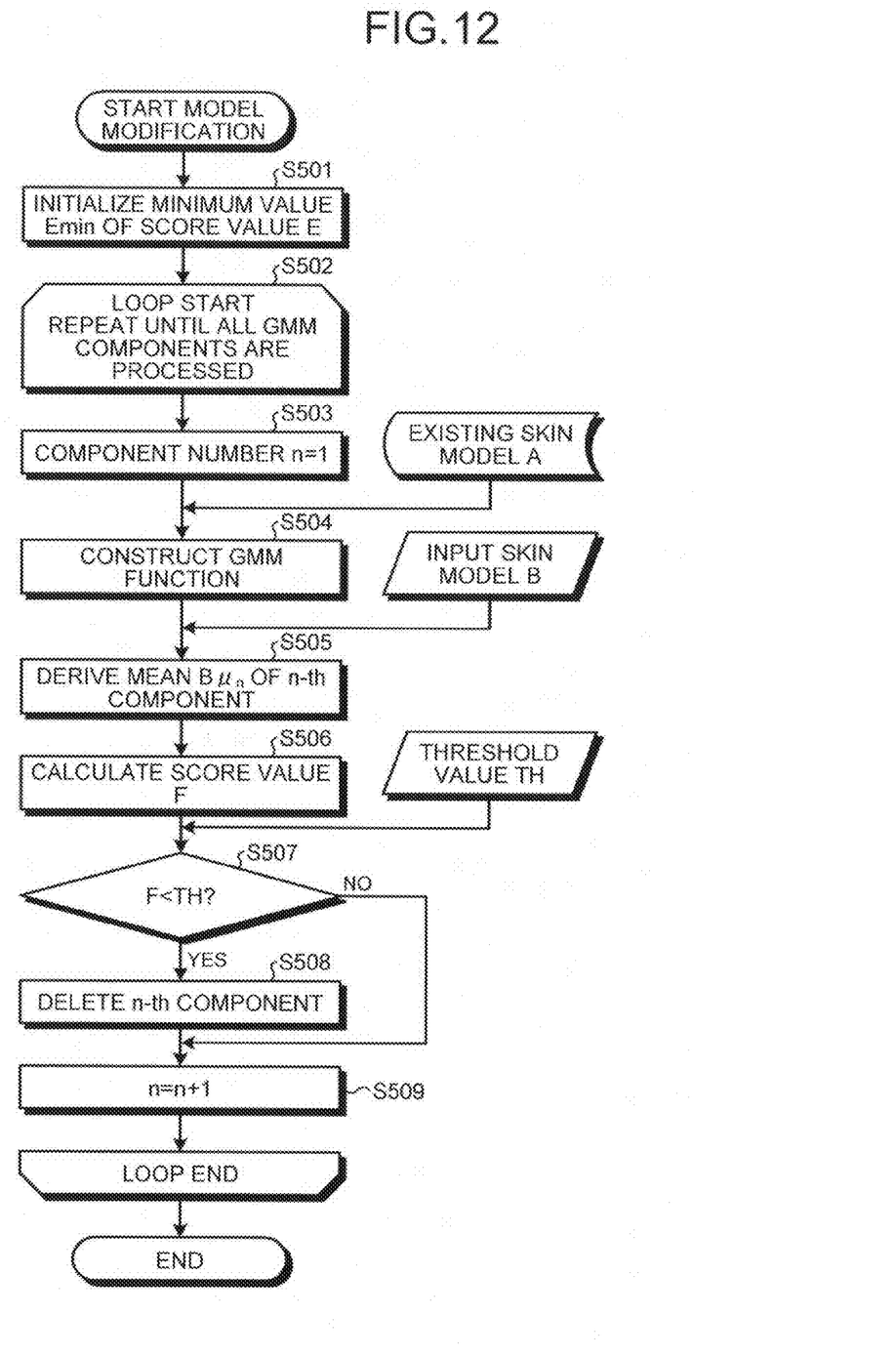
FIG. 12 is a flowchart of a model modifying step.

FIG. 12 is a flowchart illustrating a model modification step, Step S14 of FIG. 8, in detail. In the model modification step specifically illustrating in FIG. 12, Steps S503 to S509 are repeated until all GMM components are processed. The score value F is calculated (Steps S501 to S506). Any component whose score value F is lower than a predetermined threshold value TH is deleted (Steps S507 to S509). The score value F can be defined as: F=A (Bμ$_n$).

Figure 10:
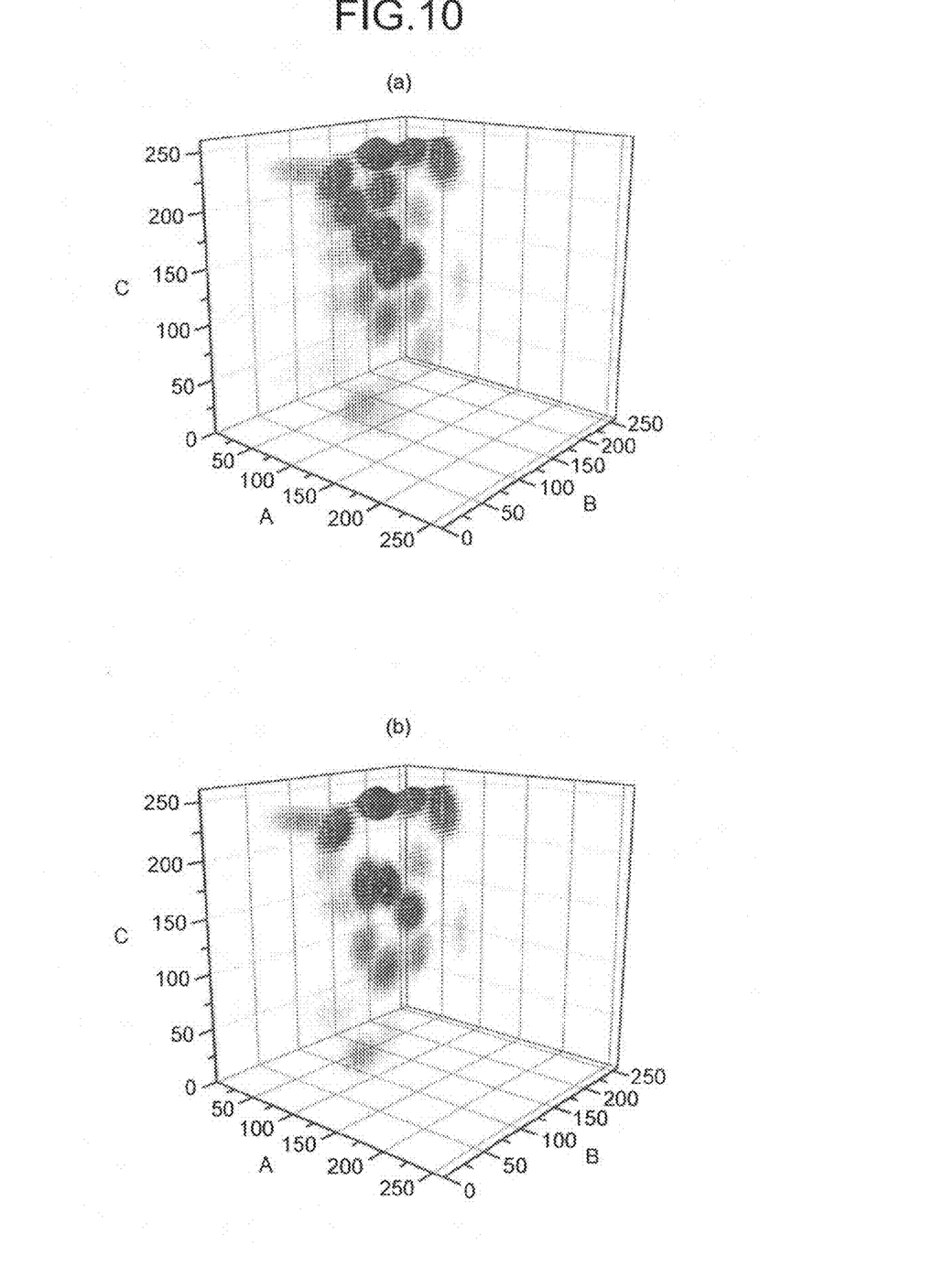
FIGS. 10(a) and 10(b) respectively illustrate an example of a probability density distribution model that is not modified yet and an example of a probability density distribution model that is modified.

FIG. 10(a) illustrates an example of a probability density distribution model that is not modified yet. FIG. 10(b) illustrates and an example of a probability density distribution model that is modified. In this example, seven GMM components are deleted because they are lower than the predetermined threshold value.

Figure 13:
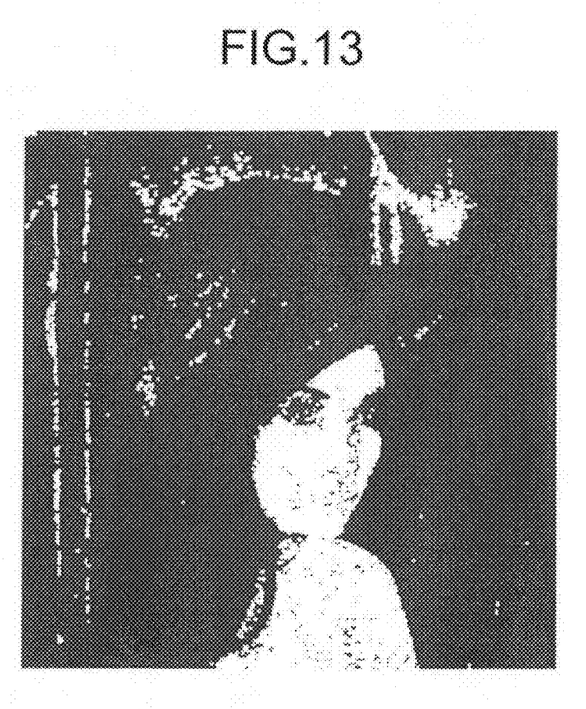
FIG. 13 illustrates a result of skin region extraction.

For example, when an image illustrated in FIG. 5(a) is given as an input image, a result of region segmentation illustrated in FIG. 13 is obtained as an output. FIG. 13 illustrates a result of skin-region extraction (pixels in a skin region are categorized and region-segmented). Spot noise removal is performed as postprocessing, by which grain noise is reduced.

As described above, according to the embodiment, a skin region can be extracted from an input image with high accuracy by utilizing a skin-region-image-data model obtained under a specific condition (lighting, race, individual, and the like). The embodiment is suitable for application to image segmentation technique for extracting a specific region from an electrophotograph.

According to an aspect of the present invention, a specific region can be extracted from an input image with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing method for extracting a region having a specific feature, the image processing method comprising:
   extracting pixels representing an object, to which the pixel having the specific feature belongs, from a given input image based on an image feature other than color;
   extracting principal colors from the pixels;
   selecting, from a plurality of pre-trained color distribution models deposited in a repository, a color distribution model closest in a distance metric to the extracted principal colors by performing a search through the repository using the extracted principal colors, the distance metric indicating distance relative to the extracted principal colors;
   segmenting the input image by categorizing pixels in the input image using the selected color distribution model; and
   modifying a Gaussian mixture model (hereinafter, "GMM") obtained from the input image based on score values of components of the GMM obtained from the input image, wherein in the step of modifying:
   a score value is an output obtained by inputting a mean of the components of the GMM of the input image to the GMM deposited in the repository,
   the score value of each of the components of the GMM of the input image is compared with a predetermined threshold value,
   any component of which score value is equal to or lower than the threshold value of the components is deleted from the GMM of the input image, and
   weights of remaining components, the remaining components being the components of the GMM of the input image exclusive of the deleted component, are re-defined so that a sum of the weights of the remaining components is one.

2. The image processing method according to claim 1, wherein
   the object, to which the pixel having the specific feature belongs, is a human face, and
   the step of extracting pixels includes extracting a face region.

3. The image processing method according to claim 1, wherein the step of extracting principal colors includes:

calculating a probability density distribution from distribution of the pixels in a predetermined color space, and approximating the probability density distribution by the GMM.

4. The image processing method according to claim 1, wherein the distance metric is an inverse of probability density distribution obtained as an output value by inputting the plurality of principal colors extracted from the input image to the color distribution model deposited in the repository.

5. The image processing method according to claim 1, further comprising segmenting the input image by categorizing the pixels in the input image using the modified GMM when the search results in failure.

6. An image processing apparatus for extracting a region having a specific feature, the image processing apparatus comprising:
    circuitry configured to:
        extract pixels representing an object, to which the pixel having the specific feature belongs, from a given input image based on an image feature other than color;
        extract principal colors from the pixels;
        select, from a plurality of pre-trained color distribution models deposited in a repository, a color distribution model closest in a distance metric to the extracted principal colors by performing a search through the repository using the extracted principal colors, the distance metric indicating distance relative to the extracted principal colors;
        segment the input image by categorizing pixels in the input image using the selected color distribution model; and
        modify a Gaussian mixture model (hereinafter, "GMM") obtained from the input image based on score values of components of the GMM obtained from the input image, wherein
        a score value is an output obtained by inputting a mean of the components of the GMM of the input image to the GMM deposited in the repository,
        the score value of each of the components of the GMM of the input image is compared with a predetermined threshold value,
        any component of which score value is equal to or lower than the threshold value of the components is deleted from the GMM of the input image, and
        weights of remaining components, the remaining components being the components of the GMM of the input image exclusive of the deleted component, are re-defined so that a sum of the weights of the remaining components is one.

7. A non-transitory computer-readable recording medium that contains a computer program that when executed causes a computer to:
    extract pixels representing an object, to which the pixel having the specific feature belongs, from a given input image based on an image feature other than color;
    extract principal colors from the pixels;
    select, from a plurality of pre-trained color distribution models deposited in a repository, a color distribution model closest in a distance metric to the extracted principal colors by performing a search through the repository using the extracted principal colors, the distance metric indicating distance relative to the extracted principal colors;
    segment the input image by categorizing pixels in the input image using the selected color distribution model; and
    modify a Gaussian mixture model (hereinafter, "GMM") obtained from the input image based on score values of components of the GMM obtained from the input image, wherein
    a score value is an output obtained by inputting a mean of the components of the GMM of the input image to the GMM deposited in the repository,
    the score value of each of the components of the GMM of the input image is compared with a predetermined threshold value,
    any component of which score value is equal to or lower than the threshold value of the components is deleted from the GMM of the input image, and
    weights of remaining components, the remaining components being the components of the GMM of the input image exclusive of the deleted component, are re-defined so that a sum of the weights of the remaining components is one.

* * * * *